(12) United States Patent
Lohmann

(10) Patent No.: US 12,203,540 B2
(45) Date of Patent: Jan. 21, 2025

(54) BEAD FOR HOUSING BUSHINGS

(71) Applicant: ZF Friedrichshafen AG, Friedrichshafen (DE)

(72) Inventor: Christian Lohmann, Witten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/905,306

(22) PCT Filed: Mar. 1, 2021

(86) PCT No.: PCT/EP2021/054975
§ 371 (c)(1),
(2) Date: Aug. 30, 2022

(87) PCT Pub. No.: WO2021/197728
PCT Pub. Date: Oct. 7, 2021

(65) Prior Publication Data
US 2023/0358307 A1 Nov. 9, 2023

(30) Foreign Application Priority Data
Mar. 31, 2020 (DE) .................... 10 2020 204 205.5

(51) Int. Cl.
| F16H 57/02 | (2012.01) |
| F16H 57/031 | (2012.01) |
| F16H 57/033 | (2012.01) |
| F16H 57/04 | (2010.01) |
| F16H 57/03 | (2012.01) |
| F16H 57/08 | (2006.01) |

(52) U.S. Cl.
CPC ......... *F16H 57/031* (2013.01); *F16H 57/033* (2013.01); *F16H 57/03* (2013.01); *F16H 57/0408* (2013.01); *F16H 57/08* (2013.01)

(58) Field of Classification Search
CPC .......... F16H 1/28; F16H 57/03; F16H 57/031; F16H 57/033; F16H 57/0408; F16H 57/08
See application file for complete search history.

(56) References Cited

U.S. PATENT DOCUMENTS

| 3,000,229 A | * | 9/1961 | Joseph | ................. | F16H 57/023 |
| | | | | | 74/411 |
| 6,100,615 A | | 8/2000 | Birkestrand | | |
| 6,579,202 B2 | | 6/2003 | El-Antably et al. | | |
| 7,510,495 B2 | | 3/2009 | Nagai et al. | | |

(Continued)

FOREIGN PATENT DOCUMENTS

| CN | 103 671 741 | | 3/2014 | | |
| CN | 103867652 A | * | 6/2014 | ............... | F16H 1/36 |

(Continued)

OTHER PUBLICATIONS

Machine translation of JP 2017-141936 A obtained on Dec. 6, 2023.*

(Continued)

*Primary Examiner* — Adam D Rogers
(74) *Attorney, Agent, or Firm* — Finch & Maloney PLLC

(57) ABSTRACT

A transmission housing (101, 111) has at least one bead (115) for forming one or more housing feed-through passages (117). A method of producing the transmission housing and a transmission series are also disclosed.

7 Claims, 2 Drawing Sheets

(56) References Cited

U.S. PATENT DOCUMENTS

| | | | |
|---|---|---|---|
| 9,944,229 B2* | 4/2018 | Kelly | F16H 57/0402 |
| 2014/0031160 A1 | 1/2014 | Suzuki et al. | |
| 2023/0243416 A1* | 8/2023 | Kosaki | F16H 57/082 |
| | | | 475/331 |

FOREIGN PATENT DOCUMENTS

| | | | | |
|---|---|---|---|---|
| CN | 105202119 B | * | 1/2019 | F16H 1/32 |
| CN | 112343971 A | * | 2/2021 | F16H 1/32 |
| DE | 634702 C | * | 9/1936 | |
| DE | 601 06 376 T2 | | 2/2006 | |
| DE | 102005010756 A1 | * | 9/2006 | F16H 57/021 |
| DE | 102006000018 A1 | | 9/2006 | |
| DE | 10 2006 039 652 A1 | | 3/2007 | |
| DE | 102014112936 B3 | * | 1/2016 | F16H 57/033 |
| JP | 2017141936 | | 8/2017 | |
| KR | 101517721 B1 | * | 5/2015 | |

OTHER PUBLICATIONS

Machine translation of CN 103671741 A A obtained on Jan. 17, 2024.*

Machine translation of DE 102014112936 B3 obtained on Jan. 19, 2024.*

Machine translation of CN 10386762 A obtained on Jan. 19, 2024.*

Herrmann K., Techonologische und organisatorische Systembewertung undgestaltung spanender Fertigungslinien nach den Prinzipien der schlanken Produktion, Dissertation Universitat Paderborn, (Mar. 23, 2019).

German Patent Office, Search Report issued in German patent application No. 10 2020 204 205.5 (Nov. 10, 2020).

European Patent Office, Search Report issued in International patent application No. PCT/EP2021/054975 (Jun. 1, 2021).

European Patent Office, Written Opinion issued in International patent application No. PCT/EP2021/054975 (Jun. 1, 2021).

* cited by examiner

BEAD FOR HOUSING BUSHINGS

RELATED APPLICATIONS

This application claims the benefit under 35 U.S.C. § 371 as a U.S. National Application of application no. PCT/EP2021/054975, filed on 1 Mar. 2021, which claims benefit of German Patent Application no. 10 2020 204 205.5 filed 31 Mar. 2020, the contents of which are hereby incorporated herein by reference in their entireties.

FIELD OF THE DISCLOSURE

The invention relates to a transmission housing and a method for producing a transmission housing.

BACKGROUND

From the prior art transmission housings with housing feed-through passages are known. To save costs and weight, housings are made with a wall thickness only as large as is required for strength reasons. Areas of increased thickness are needed in the vicinity of housing feed-through passages. The position of the housing feed-through passages is determined by these areas of increased thickness.

It is possible to position the housing feed-through passages flexibly if a transmission housing has more areas of increased thickness than the number of housing feed-through passages. In that case a choice can be made between a number of thickened areas for positioning the feed-through passages. However, the unused thickened areas increase production costs. Furthermore, the position of housing feed-through passages still depends on the position of the thickened areas. For example, a housing feed-through passage cannot be located at an intermediate position.

SUMMARY

The purpose of the present invention is to improve a transmission housing which has housing feed-through passages. This objective is achieved by a transmission and method of producing the same. Preferred further developments are described in the following detailed description and from the example embodiment illustrated in FIG. 1.

According to the invention, the transmission housing has at least one bead in which can be formed one or more housing feed-through passages. The bead is an area of increased thickness. Its distinguishing feature is that it is raised relative to one or more surrounding areas of the transmission housing. The surrounding areas are directly adjacent to the bead. Thus, the surface of the bead is raised relative to the surfaces of the surrounding areas. In other words, the surface of the bead projects farther into the surrounding space than the surfaces of the surrounding areas.

A housing feed-through passage is a passage opening in a wall of the transmission housing. A passage opening has exactly two apertures. It is characterized in that it connects an inside space of the transmission housing with its surroundings. Thus, the passage opening opens into the inside space and into the surroundings of the transmission housing. The passage opening can, for example, be in the form of a through-going bore.

The one or more housing feed-through passages of the transmission according to the invention open into the bead. This means that the bead has an aperture of each of the housing feed-through passages.

By virtue of the bead it is possible to form housing feed-through passages in various positions and/or to form different housing feed-through passages. This enables an unprocessed housing component to be used flexibly for various applications with different housing feed-through passages, without re-designing it.

Each of the one or more housing feed-through passages preferably comprises one or more fixing means. Preferably, these are in the form of threads, particularly internal threads cut into the housing feed-through passages.

The fixing means serve, for example, for fixing oil lines, sensors, closing plugs, or sight glasses. The oil lines are preferably fixed on both sides of a housing feed-through passage. By way of the housing feed-through passage the oil lines are then connected to one another to carry oil. A housing feed-through passage closed off by a plug serves, for example, as an oil-filling or draining opening. A sight glass enables the oil level and the condition of the oil in the transmission housing to be checked.

The bead is preferably rotationally symmetrical. In a preferred further development, the bead has the shape of a torus. A torus is a rotation body whose rotation axis extends through a hole in the body and does not therefore intersect the body. With a torus-shaped bead there are precisely two of the above-described areas around the bead.

In a further preferred further development, the transmission housing has an opening for an input shaft or an output shaft. The input shaft extends through the opening and is preferably sealed relative to the opening by one or more seals. In this further development, the bead and the opening are arranged coaxially with one another. This means that the bead and the opening have the same axis. Thus, they have coincident central or symmetry axes.

The transmission housing is preferably developed further with a ring gear and a connection piece. The ring gear is, for example, the ring gear of a planetary stage. A shaft connected in a rotationally fixed manner to a planetary carrier of the planetary stage preferably forms the above-described input or output shaft.

The connection piece connects the ring gear to the opening. In particular, the connection piece itself can contain the opening. Furthermore, the ring gear and the connection piece are joined to one another or made integrally as one component. In this further development the connection piece contains the bead.

In another preferred further development, the bead has at least one flat surface. This has, for example, the shape of a circular ring. The one or more housing feed-through passages preferably open into the flat surface. Preferably, the flat surface serves as a sealing surface. The flat surface also simplifies the forming of the one or more housing feed-through passages.

The bead is preferably made as one piece. In particular, according to this further development, no separation surface is formed between different housing components by the bead.

Preferably, the bead is developed further by virtue of at least one of the above-mentioned housing feed-through passages.

A method according to the invention serves for the production of a first transmission housing and a second transmission housing. The first transmission housing and the second transmission housing are transmission housings according to the invention or preferred further developments thereof.

The first transmission housing is made from a first unprocessed housing component. Correspondingly, the second transmission housing is made from a second unprocessed housing component. An unprocessed housing component means a semi-finished component from which the first transmission housing or the second transmission housing will be made.

According to the invention, the first and second unprocessed transmission housing components are identically designed. That is the case when the unprocessed transmission housing components are the same in their physical parameters to within the relevant manufacturing tolerances, particularly in relation to their material and geometrical properties.

The first unprocessed transmission housing component and the second unprocessed transmission housing component each has a bead. In the bead of the first unprocessed transmission housing component and in the bead of the second unprocessed transmission housing component various housing feed-through passages are formed. In detail, one or more housing feed-through passages are formed in the bead of the first unprocessed transmission housing component, while the bead of the second unprocessed transmission housing component remains without a housing feed-through passage or at least one housing feed-through passage formed in the first unprocessed transmission housing component differs from all of the housing feed-through passages formed in the bead of the second unprocessed transmission housing component.

A first housing feed-through passage formed in the bead of the first unprocessed transmission housing component and a second housing feed-through passage formed in the bead of the second unprocessed transmission housing component differ from one another when the first housing feed-through passage and the second housing feed-through passage differ as regards their geometrical designs and/or their positions relative to the unprocessed transmission housing component concerned or relative to reference points in the respective unprocessed transmission housing components which correspond to one another.

Owing to the use of identically designed unprocessed transmission housing components according to the invention, scale effects are achieved by virtue of which costs can be saved.

The transmission housing according to the invention or a preferred further development thereof is preferably part of a first transmission. This belongs to a transmission series which also contains a second transmission. The second transmission has a second transmission housing designed according to the invention or a preferred further development thereof. The first transmission housing and the second transmission housing are made from unprocessed transmission housing components of identical design using the method according to the invention.

A transmission series is an arrangement of at least two transmissions which match as regards the expression of at least one technical feature. The first and second transmissions of the present series match as regards the design of their transmission housings in accordance with the invention.

BRIEF DESCRIPTION OF THE DRAWING

A preferred example embodiment is illustrated in FIGS. 1 and 2. In detail, the figures show.

DETAILED DESCRIPTION

Figure 1:
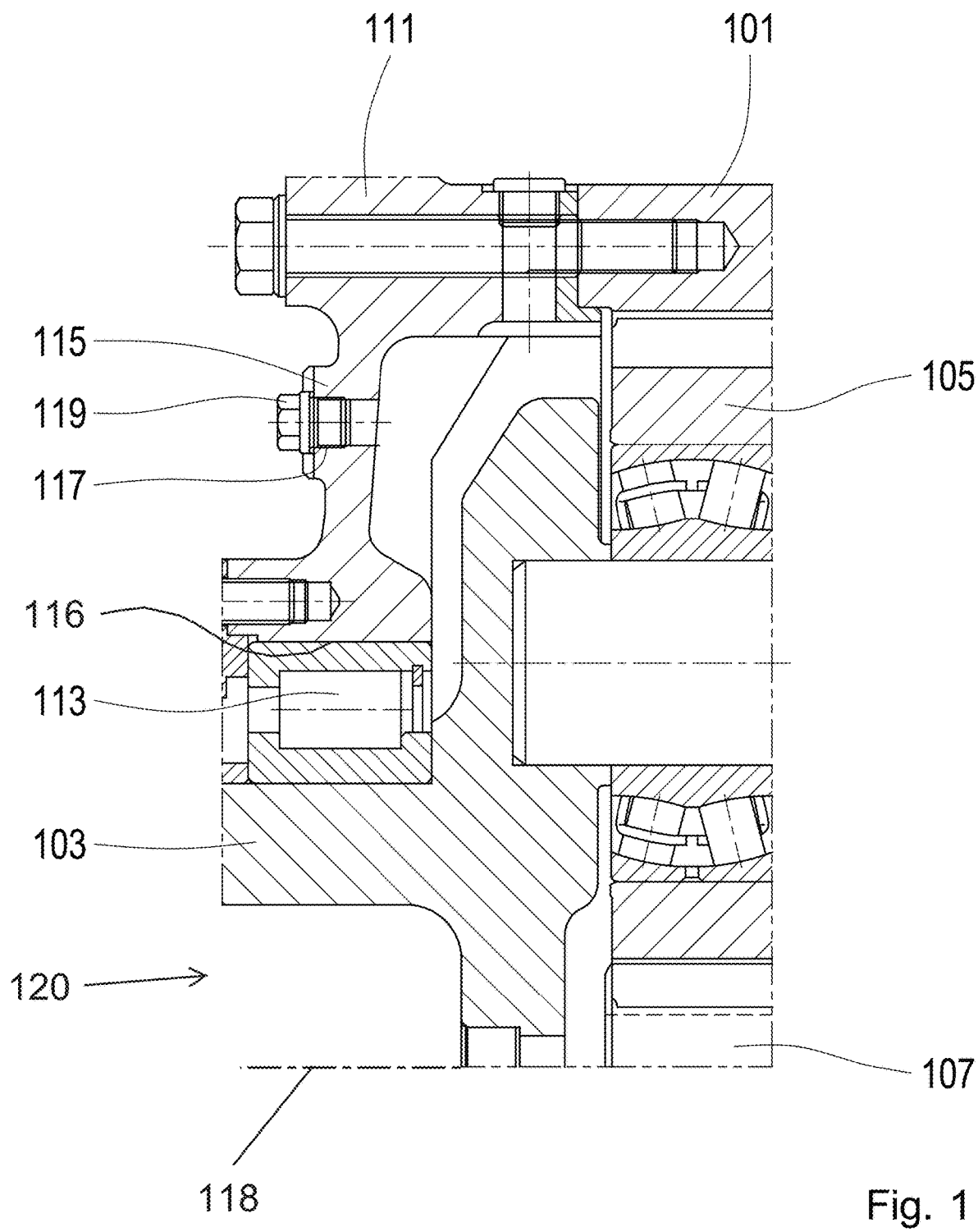
FIG. 1: Part of a sectioned representation of a transmission.

The section shown in FIG. 1 relates to a planetary stage with a ring gear 101, a rotatably mounted planetary carrier 103, planetary gearwheels 105 and a sun gear 107. The planetary gearwheels 105 mesh with both the ring gear 101 and the sun gear 107.

The ring gear 101 is part of a transmission housing. The transmission housing also has a housing cover 111. This has a flange which is bolted to the ring gear 101. The housing cover 111 has an opening 120 for an input shaft or an output shaft 103 and which also forms a bearing seat 116 for a bearing 113, by means of which the planetary carrier 103 is rotatably mounted. A shaft is connected in a rotationally fixed manner to a planetary carrier of the planetary stage and preferably forms the above-described input or output shaft 103.

In the housing cover 111 there is a bead 115. The bead 115 is rotationally symmetrical relative to a rotation axis of the planetary carrier 103. The bead 115 and the opening 120 are arranged coaxially with one another along a central or symmetry axis 118. It is provided with a through-going threaded bore 117. A closure plug 119 is screwed into the threaded bore 117.

Figure 2:
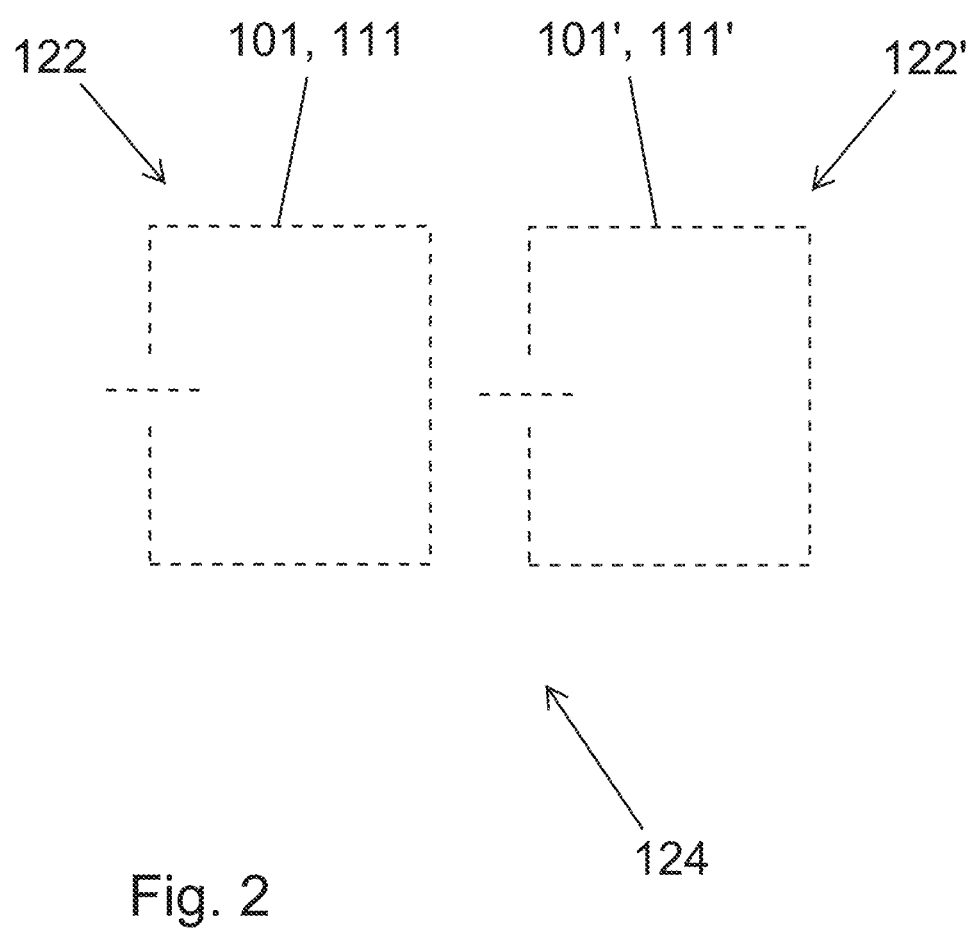
FIG. 2: A transmission series diagrammatically showing an arrangement of at least first and second transmissions with transmission housings in accordance with the invention.

The threaded bore can be formed in any position on the bead 115. Thus, in the form shown the housing is suitable, by repositioning the threaded bore 117, to undergo design modifications for various application possibilities. The transmission housing 101, 111 is preferably part of a first transmission 122. The first transmission 122 belongs to a transmission series 124, as diagrammatically shown in FIG. 2, which also contains a second transmission 122'. The second transmission has a second transmission housing 101', 111' designed according to the invention or a preferred further development thereof. The first transmission housing 101, 111 and the second transmission housing 101', 111' are made from unprocessed transmission housing components of identical design.

INDEXES

101 Ring gear
103 Planetary carrier
105 Planetary gearwheel
107 Sun gear
111 Housing cover
113 Bearing
115 Bead
117 Threaded bore
119 Closure plug

The invention claimed is:

1. A transmission housing comprising a connection piece and a ring gear, the connection piece having an inner side and an opposite outer side, the connection piece being connected to the ring gear such that the inner side of the connection piece faces the ring gear and defines an inside space of the transmission housing, the connection piece defines a central axis and supports a planetary stage within the inside space, the connection piece having at least one bead configured for forming one or more housing feed-through passages, the at least one bead of the connection piece is an area of increased material thickness and extends axially from the outer side of the connection piece, the at least one bead having a surface that is raised relative to surrounding surfaces of the outer side of the connection piece such that the at least one bead projects axially farther into an outer space surrounding the transmission housing than the surrounding surfaces of the outer side of the connection piece, and the surrounding surfaces are radially directly adjacent to the at least one bead, the at least one bead is in the shape of a torus, the connection piece has an opening for an input or output shaft, wherein the opening is coaxial with the at least one bead, and the ring gear and the connection piece are fixed to each other which connects the ring gear to the opening, wherein the bead is formed in a radial direction between a radial inner surrounding surface and a radially outer surrounding surface of the outer side of the connection piece.

2. The transmission housing according to claim 1, wherein the at least one bead comprises at least one flat surface and the at least one flat surface is axially separated from the surrounding surfaces of the outer side of the connection piece.

3. The transmission housing according to claim 1, wherein the at least one bead is made as one piece.

4. The transmission housing according to claim 1, wherein the at least one bead defines the one or more housing feed-through passages, such that the one or more housing feed-through passages extend axially from the inner side of the connection piece beyond the surrounding surfaces of the outer side of the connection piece.

5. A method for producing first and second transmission housings from first and second unprocessed transmission housing components, respectively, the method comprising:

providing the first unprocessed transmission housing component and the second unprocessed transmission housing component, wherein the first unprocessed transmission housing component and the second unprocessed transmission housing component are of identical design such that each of the first and the second unprocessed transmission housing components comprises a connection piece and a ring gear, the connection piece having an inner side and an opposite outer side, the connection piece being connected to the ring gear such that the inner side of the connection piece faces the ring gear and defines an inside space of the transmission housing, the connection piece defines a central axis and supports a planetary stage within the inside space, the connection piece having at least one bead configured for forming one or more housing feed-through passages, the at least one bead of the connection piece is an area of increased material thickness and extends axially from the outer side of the connection piece, the at least one bead having a surface that is raised relative to surrounding surfaces of the outer side of the connection piece such that the at least one bead projects axially farther into an outer space surrounding the transmission housing than the surrounding surfaces of the outer side of the connection piece, and the surrounding surfaces are radially directly adjacent to the at least one bead, the at least one bead is in the shape of a torus, the connection piece has an opening for an input or output shaft, wherein the opening is coaxial with the at least one bead, and the ring gear and the connection piece are fixed to each other which connects the ring gear to the opening, wherein the bead is formed in a radial direction between a radial inner surrounding surface and a radially outer surrounding surface of the outer side of the connection piece, forming at least one first housing feed-through passage in the at least one bead of the first unprocessed transmission housing component and either retaining the at least one bead of the second unprocessed transmission housing free of a housing feed-through passage or forming at least one second housing feed-through passage in the at least one bead of the second unprocessed transmission housing component, the at least one second housing feed-through passage being different than the at least one first housing feed-through passage; and making first and second transmissions, respectively, from the first and the second unprocessed transmission housing components.

6. A transmission series with a first transmission and a second transmission, wherein the first transmission and the second transmission respectively comprise the first and the second transmission housings produced by a method according to claim 5.

7. The transmission series according to claim 6, wherein the first transmission housing and the second transmission housing are at least partially of identical design.

* * * * *